(12) United States Patent
Kochura et al.

(10) Patent No.: US 11,195,102 B2
(45) Date of Patent: Dec. 7, 2021

(54) NAVIGATION AND COGNITIVE DIALOG ASSISTANCE

(71) Applicant: International Business Machines Corporation, Armonk, NY (US)

(72) Inventors: Nadiya Kochura, Bolton, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 15/959,625

(22) Filed: Apr. 23, 2018

(65) Prior Publication Data

US 2019/0325322 A1 Oct. 24, 2019

(51) Int. Cl.
*G06N 5/02* (2006.01)
*G06N 20/00* (2019.01)
*G06F 40/211* (2020.01)

(52) U.S. Cl.
CPC ............. *G06N 5/02* (2013.01); *G06F 40/211* (2020.01); *G06N 20/00* (2019.01)

(58) Field of Classification Search
CPC ......... G06N 5/02; G06N 20/00; G06F 40/211
See application file for complete search history.

(56) References Cited

U.S. PATENT DOCUMENTS

| | | | |
|---|---|---|---|
| 6,477,460 | B2 | 11/2002 | Kepler |
| 7,920,968 | B2 | 4/2011 | Chapin et al. |
| 2008/0319659 | A1 | 12/2008 | Horvitz et al. |
| 2014/0032110 | A1 | 1/2014 | Simring |
| 2016/0216131 | A1 | 7/2016 | Khorana |
| 2017/0030726 | A1* | 2/2017 | French ............... G01C 21/3461 |
| 2017/0270925 | A1* | 9/2017 | Kennewick ............. G10L 15/00 |
| 2017/0314954 | A1 | 11/2017 | Golding et al. |
| 2017/0343363 | A1 | 11/2017 | Goldberg et al. |
| 2018/0157923 | A1* | 6/2018 | el Kaliouby, Jr. et al. .................. G06K 9/00302 |

FOREIGN PATENT DOCUMENTS

| | | |
|---|---|---|
| CN | 104183144 | 12/2014 |
| EP | 3244166 | 11/2017 |
| WO | 2009075912 | 6/2009 |

OTHER PUBLICATIONS

Patent Cooperation Treaty (PCT) International Search Report, dated Aug. 20, 2019.

* cited by examiner

*Primary Examiner* — Kevin W Figueroa
(74) *Attorney, Agent, or Firm* — Lieberman & Brandsdorfer, LLC

(57) ABSTRACT

A system, computer program product, and method are provided to apply artificial intelligence and natural language processing to a route navigation module. An artificial intelligence platform transforms the functionality of the navigation module in real-time. As natural language input is received, a parser is leveraged to parse the input into grammatical sub-components. An analyzer is involved to analyze and identify an associated category for the parsed sub-component(s). A sensor is provided operatively couple to the navigation module. The parsed and analyzed data are applied to an operating state of the sensor. The artificial intelligence platform dynamically translates the identified category of the received input to a natural language instruction congruent with the parsed grammatical sub-components.

19 Claims, 10 Drawing Sheets

NAVIGATION AND COGNITIVE DIALOG ASSISTANCE

BACKGROUND

The present embodiment(s) relate to natural language processing. More specifically, the embodiment(s) relate to an artificial intelligence platform to integrate linguistics with sensor state settings and route navigation.

It is understood that conventional and known navigation systems, including modules and applications, create a passive state for generating navigation includes. Instructions are provided to convey a route for traversal from a source to a destination location. The creation of the route is based on one or more algorithms, including but not limited to, time for traversal and road preferences. The navigation systems are further known for revising the route based on a diversion. For example, if the driver of the route does not follow the traversal instructions, the navigation system will generate instructions to return to the driver to the route, or in some circumstances to revise the route.

The conventional navigation system is limited to the route and route parameters, and as such may be considered a static system. There is no consideration for the navigation system to consider the characteristics and/or limitations of the vehicle and/or driver of the vehicle for route generation and/or route guidance. The same route for different vehicle and/or different vehicle drivers may produce different outcomes. A route and associated route instructions for one driver may not be appropriate for another driver. Accordingly, there is a technical problem associated with the conventional navigation system and associated static system.

SUMMARY

The embodiments include a system, computer program product, and method for natural language processing directed at operation of a route navigation tool.

In one aspect, a computer system is provided with a processing unit operatively coupled to memory, and an artificial intelligence platform, in communication with the processing unit. A knowledge engine is provided in communication with the processing unit and functions to transform a navigational tool in real-time. A sensor is provided operatively coupled to a route navigation module, and functions to address the functionality of the module. More specifically, an information handling system receives and processes natural language (NL) input data. The information handling system utilizes a parser and an analyzer. The parser functions to parse the NL input data into two or more grammatical sub-components, and the analyzer functions to analyze the parsed data and identify a category for each parsed grammatical sub-component. The information handling system applies the parsed data and identified category to an operating state of a sensor. The sensor, together with the AI platform, dynamically translates the identified category to a NL navigation instruction congruent with the parsed sub-components.

In another aspect, a computer program device is provided to process natural language (NL). The computer program product comprising a computer readable storage device having program code embodied therewith. The program code is executable by a processing unit to receive and process natural language (NL) input data. More specifically, the program code functions to parse the NL input data into two or more grammatical sub-components, analyze the parsed data, and identify a category for each parsed grammatical sub-component. The program code functions to apply the parsed data and identified category to an operating state of a sensor operatively coupled to a route navigation module. An association artificial intelligence platform transforms the navigation module in real-time, including dynamic translation of the identified category to a NL navigation instruction congruent with the parsed sub-components.

In yet another aspect, a method is provided for processing natural language, including transforming a route navigation module data by an artificial intelligence platform. As natural language (NL) input data is detected, the data is analyzed and parsed into two or more grammatical sub-components. The parsed data is then analyzed and a category for each parsed grammatical sub-component is identified. The parsed data and identified category are applied to an operating state of a sensor operatively coupled to a route navigation module. This application includes transforming the navigational modules in real-time by an operatively coupled artificial intelligence (AI) platform, including the AI platform dynamically translating the identified category to a NL navigation instruction congruent with the parsed sub-components.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
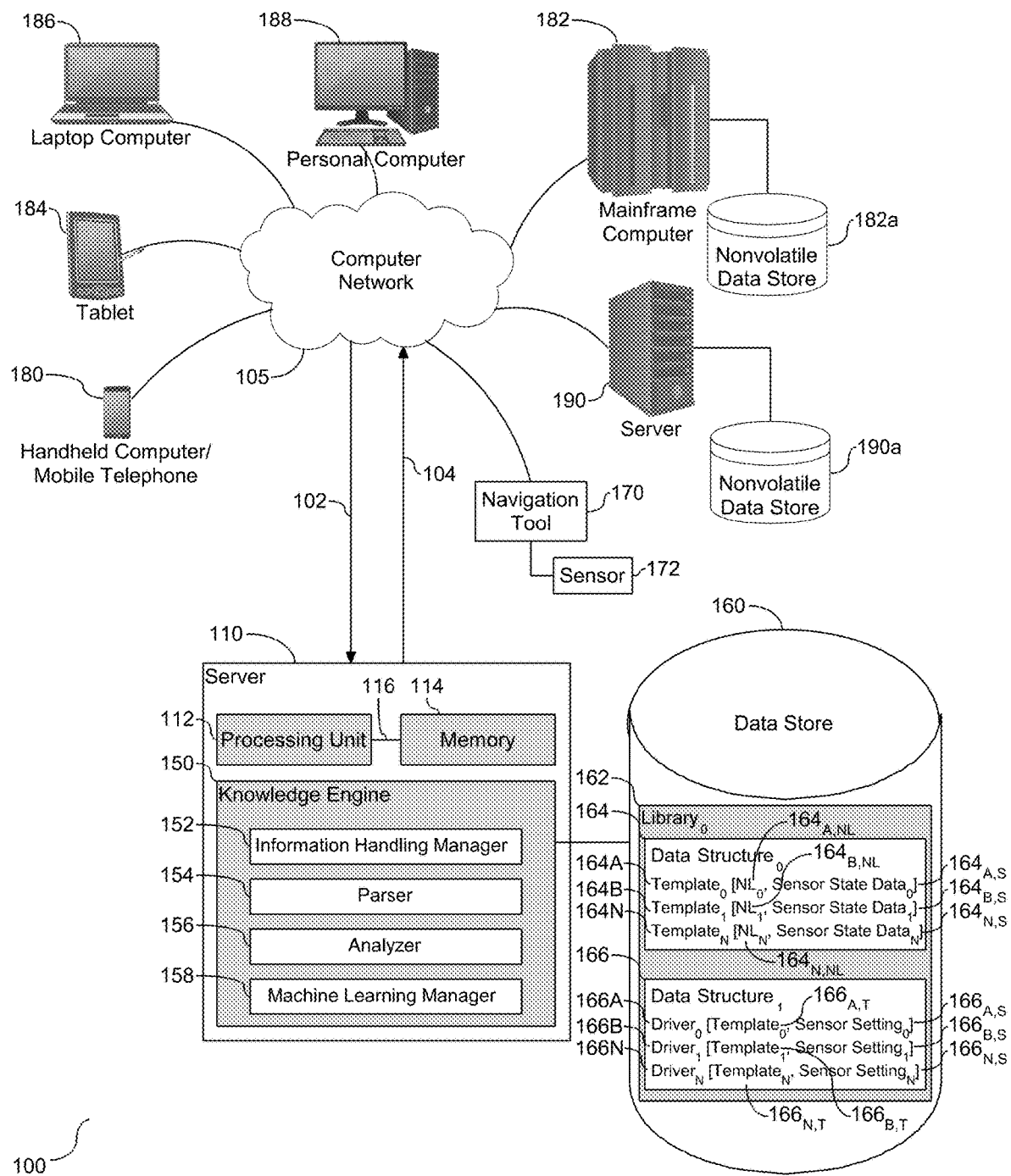
FIG. 1 depicts a system diagram illustrating a schematic diagram of a natural language process system.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificial intelligent computer systems, natural language systems (such as the IBM Watson™ artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data, visual recognition, and natural language processing to solve problems and optimize processes.

Navigation is defined as the art of process of planning a route or directing travel of an object. A global positioning system (GPS) is a navigational system that uses satellite signals to determine latitude and longitude of a receiver on Earth. The GPS has evolved in recent years, and is commonly found in land vehicles and smartphone devices. Most current GPS systems utilize a visual display to present a map, a position on the map, and in some circumstances directions associated with a requested navigation query. GPS systems are commonly employed to provide directions from a start location to an end location. The directions may be input through an interface, or in some configurations a microphone. The visual display is utilized to present one or more images directed at the navigation. Voice navigation is another feature commonly found in the GPS systems. The voice navigation conveys directions for a selected route in the form of spoken instructions. In one embodiment, the voice navigation may be updated during route traversal to reflect a change in circumstances, such as traffic, road conditions, etc. The voice navigation is known to use an electronic voice to convey route traversal instructions. Data conveyed through the electronic voice is known to provide traversal instructions via road name, highway exit and entrance numbers, and distance. In the event there is a deviation from the generated route, instructions are re-calculated and/or re-generated based on changes in position and associated position data.

The GPS system is trained with data derived from a data source or corpus, also referred to herein as a knowledge base. It is understood that different users of the GPS may have different needs and requirements for effectively utilizing the GPS. For example, one user of the GPS system may have a perception of visual surroundings that is not effectively conveyed via a current configuration of the system. The data in the knowledge base may not properly translate to directions that are clear or clearly understood. At the same time, it is understood that stress or anxiety may set it during route traversal. One or more sensors are utilized independently or in conjunction with natural language understanding (NLU) to comprehend real-time traversal conditions, and in one embodiment, a cognitive state of the driver, and adapt the route and/or communication of route traversal instructions. Accordingly, NLU together with real-time physical assessment data is utilized to train the GPS system and dynamically modify and/or convey customized route traversal instructions.

Referring to FIG. 1, a schematic diagram of a natural language processing system (100) is depicted. As shown, a server (110) is provided in communication with a plurality of computing devices (180), (182), (184), (186), and (188) across a network connection (105). In addition to the computing devices, a navigation tool (170), also referred to herein as a global positioning system (GPS), and an operatively coupled sensor (172) are shown in communication with the server (110) across the network connection (105). Although shown herein as a hardware tool, in one embodiment, the navigation tool (170) may function as a software component, e.g. application. The server (110) is configured with a processing unit (112) operatively coupled to memory (114) across a bus (116). A tool in the form of a knowledge engine (150) is shown local to the server (110), and operatively coupled to the processing unit (112) and/or memory (114). The knowledge engine (150) supports natural language (NL) processing over the network (105) from one of the GPS (170) and/or computing devices (180)-(188).

As shown, the knowledge engine (150) contains one or more tools (152)-(156) to support artificial intelligence (AI) and NL processing over the network (105) from the GPS (170) and/or the one or more of the computing devices (180), (182), (184), (186), and (188). More specifically, the GPS (170) and/or computing devices (180), (182), (184), (186), and (188) communicate with each other and with other devices or components via one or more wires and wireless data communication links, where each communication link may comprise one or more wires, routers, switches, transmitters, receivers, or the like. In this network arrangement, the server (110) and the network connection (105) may enable NL processing and augmentation of GPS data for one or more users of content. Other embodiments of the server (110) may be used with components, system, sub-systems, and/or devices other than those depicted herein.

The tools, including the knowledge engine (150), or in one embodiment, the tools embedded therein, or the tools operatively coupled to the knowledge engine (150) include an information handling manager (152), a linguistic parser (154), an analyzer (156), and a machine learning manager (158). These tools are configured to receive input from various sources, including but not limited to input from the network (105) and/or a data store (160). The GPS (170) and/or the various computing devices (180), (182), (184), (186), and (188) in communication with the network (105) demonstrate access points for content creators and content uses. Some of the computing devices may include a corpus of data, shown herein as a data store (160), as a body of information used by the knowledge engine (150), and in one embodiment the tools (152)-(158). The network (105) may include local and remote network connections in various embodiments, such that the knowledge engine (150) and tools (152)-(158) may operate in environments of any size, including local and global, e.g. the Internet.

The data store (160) is provided with a library or storage unit (162) of sensor setting data and associated natural language understanding (NLU). As shown in this example, the library, $library_0$, (162) has one or more data structures (164) and (166) to organize sensor settings and NL construction. Although two data structures are shown, (164) and (166), the quantity should not be considered limiting. Rather, the data structures are exhibited to show alternative or duplicative manners in which the sensor data is organized and retained with respect to the NL construction. As shown in data $structure_0$ (164), NL templates are created or presented for different NL constructs and associated sensor settings. The NL template, referred to herein as a template, represents a selection or coordinated representation of phrases of NL data. Each template includes a specific word of phrases, referred to herein as NL, parsed from oral communications or a grammatical representation of the oral communications. As shown herein, each template represents an associated sensor setting, referred to herein as sensor state, for each detected or active sensor. In the example data $structure_0$ (164), three templates are shown, including $template_0$ (164A), $template_1$ (164B), and $template_N$ (164N). $Template_0$ (164A) is shown with natural language, $NL_0$ ($164_{A,NL}$) and sensor state $data_0$ ($164_{A,S}$), $template_1$ (164B) is shown with natural language, $NL_1$ ($164_{B,NL}$) and sensor state $data_1$ ($164_{B,S}$), and $template_2$ (164N) is shown with natural language, $NL_N$ ($164_{N,NL}$) and sensor state $data_2$ ($164_{N,S}$). Accordingly, the data structure (164) organizes or associates templates with NL data and sensor state data.

Data $structure_1$ (166) is directed at the GPS (170) and associated users of the GPS, also referred to herein as drivers. It is understood that the GPS (170) should not be limited to use by drivers, and in one embodiment may be employed by other users, including but not limited to pedestrians and cyclists. Furthermore, it is understood that the GPS may be accessed by more than one driver. For example, a land vehicle may be shared by two or more drivers. In one embodiment, the GPS is embedded with or otherwise associated the vehicle. For example, in one embodiment, the vehicle may have different keys, each key with embedded settings that are associated with an associated driver. The settings may be directed to the physical position of a seat, steering wheel, mirror positions, GPS settings, etc. At such time as a key is activated for the vehicle, the data structure (166) is utilized or accessed to convey template data associated with the key and directed to the associated driver of the vehicle. As shown, data $structure_1$ (166) is organized to represent a plurality of drivers of the vehicle, including $driver_0$ (166A), $driver_1$ (166B), and $driver_N$ (166N). Each driver is shown with one or more associated templates, with each template representing a selection or coordinated representation of phrases of NL data. Each template includes specific words or phrases, referred to herein as natural language (NL), parsed from oral communications. Each template has an associated sensor setting, referred to herein as sensor state, for each detected or active sensor proximal to the GPS and/or the land vehicle. In the example shown herein, $driver_0$ ($166_A$), is shown with $template_0$ ($166_{A,T}$) and sensor $setting_0$ ($166_{A,S}$), $driver_0$ ($166_B$), is shown with $template_1$ ($166_{B,T}$) and sensor $setting_1$ ($166_{B,S}$), and $driver_N$ ($166_N$), is shown with $template_N$ ($166_{N,T}$) and sensor setting ($166_{N,S}$). It is understood that each template may have a different selection and arrangement of NL terms, and each template sensor setting may include sensor setting and state data for each sensor associated with the template. Accordingly, data structure) (166) may be an alternative or duplicative manner of representing and organizing natural language data and sensor setting and state data.

In some illustrative embodiments, server (110) may be the IBM Watson™ system available from International Business Machines Corporation of Armonk, N.Y., which is augmented with the mechanisms of the illustrative embodiments described hereafter. The IBM Watson™ system may receive input content (102) which it then parses to extract features or characteristics of the content (102) that in turn are then applied to the corpus of data stored in the knowledge base (160). Based on application of the content (102) to the corpus of data, a set of candidate outcomes are generated by looking across the corpus of data for portions of the corpus of data that have some potential for containing a matching language pattern to the received content (102). The corpus of data may include data sources with phrase meanings, word attributes and/or definitions, and language translations of the aforementioned.

In particular, received content (102) may be processed by the IBM Watson™ server (110) which performs analysis of the input content (102) and the language used in each of the portions of the corpus of data found during application of the content using a variety of reasoning algorithms. There may be a plurality of reasoning algorithms applied, each of which performs different analysis, e.g. comparisons. For example, some reasoning algorithms may look at the matching of terms and synonyms within the language of the input content (102) and found portions of the corpus of data. Other reasoning algorithms may look at temporal or spatial features in the language, while other algorithms may evaluate the source of the portion of the corpus of data and evaluate its veracity.

To process NL, the system (110) may include the information handling manager (152) using the parser (154) to identify grammatical sub-components of the received input content (102). The analyzer (156) is shown operatively coupled to the parser (154). The analyzer (156) functions to detect and categorize patterns from characteristic metadata for terms in the received content, and identify a best meaning for the detected pattern. Though shown as being integrated with the server (110), the information handling manager (152), parser (154), and analyzer (156) may be implemented in a separate computing system (e.g., 190) that is connected across the network (105) to server (110). Wherever embodied, the information handling manager (152) dynamically translates the received content (102) to sensor state and setting data and a NL navigation instruction congruent with the parsed and analyzed sub-components of the received content (102).

The parser (154) is configured to apply NL processing to source data (102) and associated source data segments by mapping parsed terms and phrases from the received content (102) into one or more potential patterns. The analyzer (156) may perform a sentence structure analysis to denote terms identifying one or more patterns having a source term type connected by a comparator to a target characteristic term. For example, the parser (154) may use a Slot Grammar Logic (SGL) parser to perform parsing of a source sentence to detect or more grammatical patterns. The analyzer (156) may also be configured to apply one or more learning methods to match a detected pattern to one or more known patterns to decide and categorize the received content (102), e.g. input content. More specifically, the analyzer (156) searches the corpus (160) for evidence of the pattern. An outcome (104) for the analyzer (156) is in the form of a complete or partial match that is close to the received content (102).

The knowledge engine (150) communicates with the GPS (170), or in one embodiment an alternate navigation tool, to support and communicate the outcome data (104), including convey NL template data and associated sensor state and setting data, across the network (105). The knowledge engine (150) is local to the server (110) and represented herein as a tool. The knowledge engine (150) supports the GPS (170) as a physical hardware device in communication with the network (105). In one embodiment, the knowledge engine (150) supports a navigation service provided across the network (105) and is supported by one of the various computing devices (180), (182), (184), (186), and (188). As shown, the knowledge engine (150) includes tools to receive content (102) and to support communication of NL navigation instructions (104). The information handling manager (152) functions to receive and process NL input data conveyed across the network (105). In one embodiment, one or more of the computing devices (180) includes a microphone (not shown) to detect audio input and to convey the detected input to the information handling manager (152) across the network (105).

Types of information handling systems that can utilize the server (110) range from small handheld devices and GPS navigation units, such as handheld computer/mobile telephone (180) and GPS (170), respectively, to large mainframe systems, such as mainframe computer (182). Examples of handheld computer device (180) include personal digital assistants (PDS), personal entertainment devices, and mobile telephones, such as a smartphone. Other examples of information handling systems include pen or tablet computer (184), laptop or notebook computer (186), personal computer system (188), and server (190). As shown, the various information handling systems can be networked together using computer network (105). Types of computer networks (105) that can be used to interconnect the various information handling systems include local area networks (LANs), wireless local area networks (WLANs), the Internet, the public switched telephone network (PSTN), other wireless networks, and any other network topology that can be used to interconnect the information handling systems. May of the information handling systems include non-volatile data stores, such as hard drives and/or non-volatile memory. Some of the information handling systems may use separate non-volatile data stores (e.g., server (190) utilizes non-volatile data store (190a), and mainframe computer (182) utilizes data store (182a)). The non-volatile data store (182a) can be a component that is external to the various information handling systems or can be internal to one of the information handling system.

Figure 2:
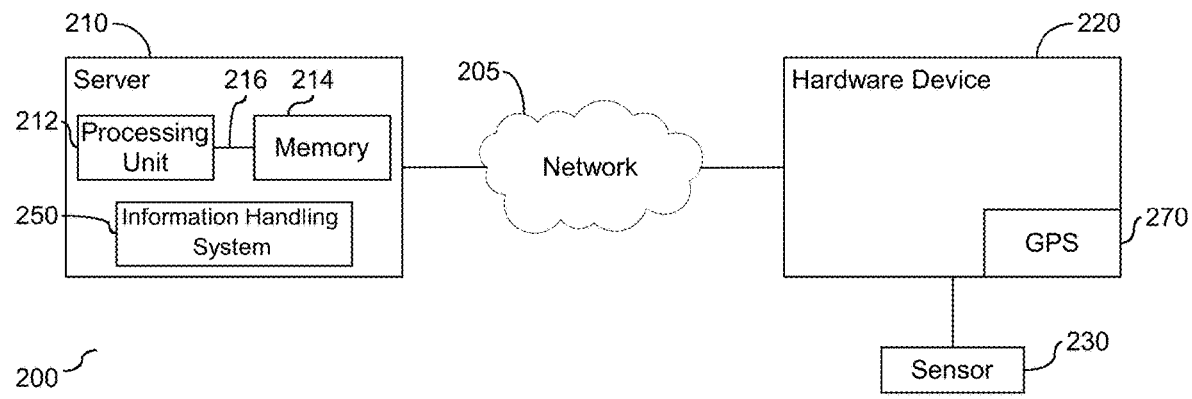
FIG. 2 depicts a block diagram illustrating a physical device and an associated sensor operatively coupled to the information handling system.

As shown and described, NL content is received and processed, and effectively transformed into knowledge. Referring to FIG. 2, a block diagram (200) is provided to illustrate a physical device and an associated sensor operatively coupled to the information handling system. As shown, the server (210) is provided in communication with a computer network (205). The server (210) includes the tools of the server (110) shown and described in FIG. 1, including a processing unit (212) operatively coupled to memory (214) across a bus (216). A physical hardware device (220) is shown in communication with the network (205), and a sensor (230) is operatively coupled to the device (220). In one embodiment, the sensor (230) is in direct communication with the network (205). A navigation tool, such as a GPS, (270) is either embedded with the device (220) or operatively coupled to the device (220). In the example shown herein, the navigation tool (270) is embedded with the device. The sensor (230) is a physical hardware device that detects or measures a physical property and responds to input from an associated physical environment. Examples of input include, but are not limited to, light, heat, motion, moisture, pressure, temperature, oxygen, or environment phenomena. Although only one sensor (230) is shown, the quantity of sensors should not be considered limiting. In one embodiment, a plurality of sensors may be provided and operatively coupled to the physical device (220). Response to the input is in the form of output, which may be conveyed as a signal that is converted to a human-readable display at the sensor location or electronically transmitted over the network (205) for reading or further processing.

The sensor (230) functions with the AI platform shown and described in FIG. 1. In one embodiment, the sensor is a capacitive sensor to detect a state of a driver of a land vehicle, such as stress level. For example, the sensor may be a capacitive-based wireless hand detection sensor to detect position and/or touch for a steering wheel. In one embodiment, the sensor may be a physiological configured to measure electro-dermal activity, such as sweat. The physiological sensor may be integrated in the driver's seat, steering wheel, or any other physical surface or component operatively coupled to the operator of the land vehicle. Sensor data may be acquired parallel with NL data, or in one embodiment, separate from the NL data. Either separately or together, both NL and sensor data are acquired and applied to navigation instructions. As shown, an information handling system (250), such as the knowledge engine (150) shown and described in FIG. 1, is embedded with the server (210), and functions to apply and/or translate the parsed NL data and the sensor data to a NL navigation instruction associated with the navigation tool (270). In one embodiment, the information handling system is operating coupled to the server (210). Details of the application and/or translation are shown and described in the flow charts.

Figure 3:
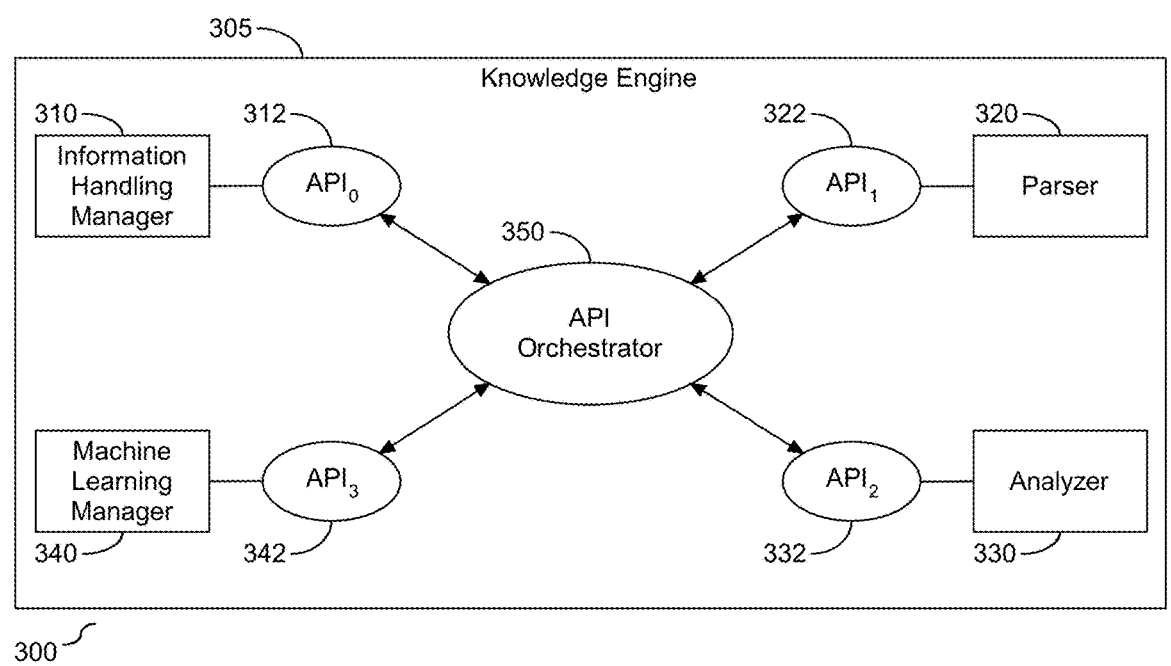
FIG. 3 depicts a block diagram illustrating the sensor and NL processing tools and their associated APIs.

The sensor identification and assessment may be accessed via API administration or orchestration platforms, as shown and described in FIG. 3, and NL input received via an NLU input path. Referring to FIG. 3, a block diagram (300) is provided illustrating the sensor and NL processing tools and their associated APIs. As shown, a plurality of tools are embedded within the knowledge engine (305), with the tools including the information handling manager (310) associated with $API_0$ (312), the parser (320) associated with $API_1$ (322), the analyzer (330) associated with $API_2$ (332), and the machine learning manager (340) associated with $API_3$ (342). Each of the APIs may be implemented in one or more languages and interface specifications. $API_0$ (312) provides for the functionality associated and supported by the information handling manager (310); $API_1$ (322) provides for the functionality associated and supported by the parser (320);

API$_2$ (332) provides for the functionality associated and supported by the analyzer (330); and API$_3$ (342) provides for the functionality associated and supported by the machine learning manager (340). As shown, each of the APIs (312), (322), (332), and (342) are operatively coupled to an API orchestrator (350), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
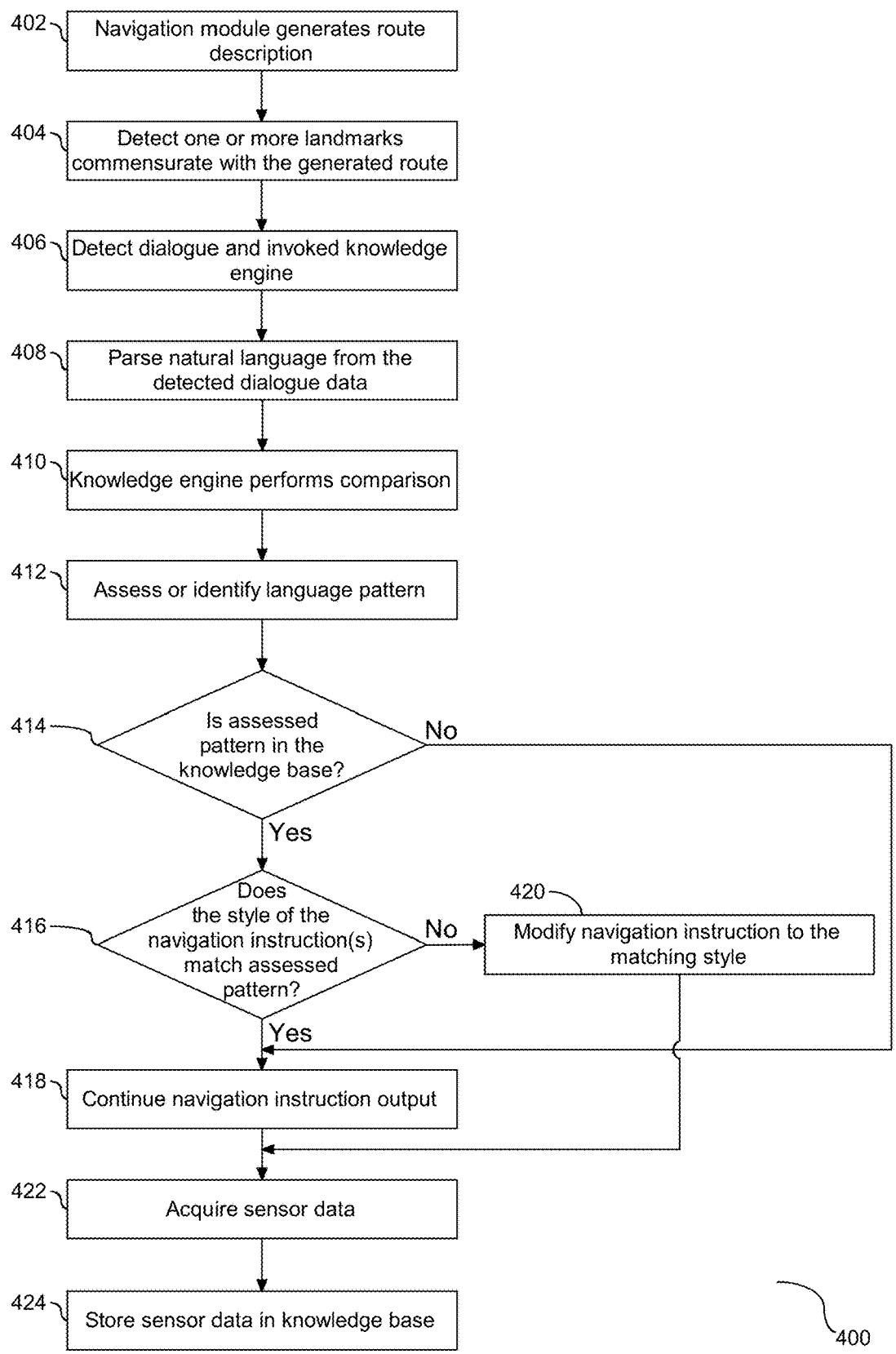
FIG. 4 depicts a flow chart illustrating functionality and flow of the pattern detection module.

Referring to FIG. 4, a flow chart (400) is provided illustrating functionality and flow of the pattern detection module. The module processes utterances, extracts visual object descriptions, and identifies patterns in language terms and levels of details used in describing visual orientations. At a setup stage, the module learns common descriptive models, which are improved dynamically at run-time using both explicit and implicit feedback. A route description is generated by the navigation module (402). During traversal, which may include the route provided in the description or a deviation from the route, one or landmarks commensurate with the generated route are detected (404). Accordingly, the navigation module assesses the generated route in real-time to detect and identify route related landmarks.

It is understood that an entity traversing the generated route may engage in dialogue, whether with another entity or self-engaging dialogue. As dialogue or voice is detected, the knowledge engine is invoked (406), and NL is parsed from the detected dialogue data (408). As shown and described in FIG. 1, aspects within the parsed dialogue are identified, including grammatical components. In one embodiment, the detected dialogue data is converted to text format, with the grammatical components identified from the text. The knowledge engine utilizes the knowledge base as a form of comparison (410) and to assess or identify a language pattern (412). Aspects of comparison may include identification of words, phrases, grammatical components, etc. from the NL processing and prior usage documented in the knowledge base. Based on a comparison with stored language patterns or usage, it is determined if the identified language that is the basis for the comparison is present in the knowledge base (414). A positive response to the determination at step (414) is followed by determining if the style of the current navigation instructions matches the style associated with the identified pattern (416). The style output of the instructions may be directed at a level of understanding for the entity subject to traversal. For example, the style may include language, dialect, complexity or simplicity of instructions, description of landmarks, etc. In one embodiment, the detected NL usage may have multiple entries in the knowledge base corresponding to multiple styles. A positive response to the determination at step (416) or a negative response to the determination at step (414) is followed by continued presentation and output of the navigation instructions (418), and a negative response to the determination at step (416) is followed by a modification of navigation instructions for the current route to the identified matching style (420). In addition to the language detection and assessment, sensors may be present or operatively coupled to the system, e.g. biometric sensors. Following steps (418) or (420), associated sensor data are acquired (422) and stored in the knowledge base together with the determined style of the instructions (424). Accordingly, the assessment shown and described herein is based on detection and assessment of verbal content and NL processing.

Figure 5:
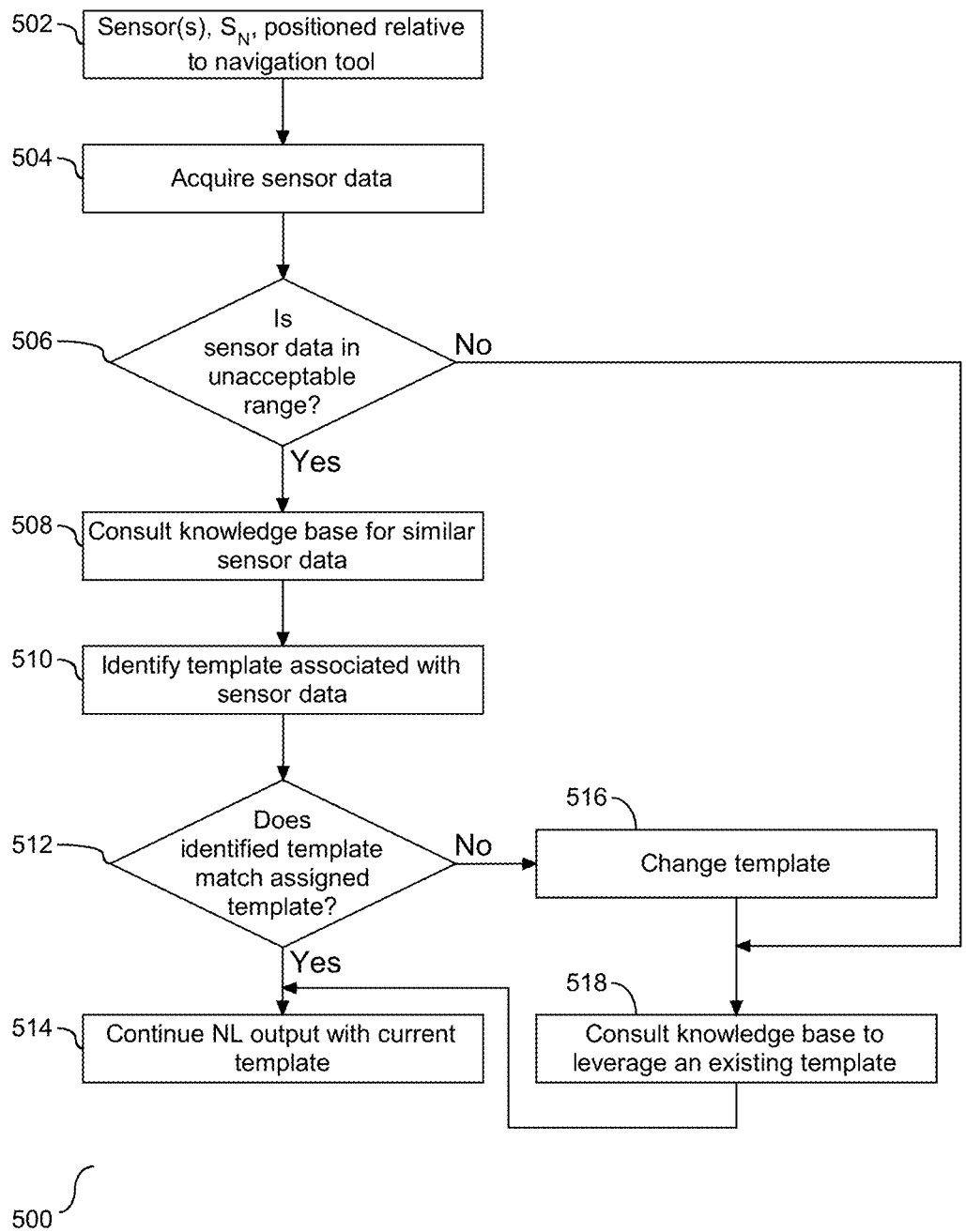
FIG. 5 depicts a flow chart illustrating demonstrating a dynamic sensor activation of the NL processing system.

Other factors may be employed with navigation instructions assessment, including cognitive assessment. For example, in one embodiment, one or more sensors, such as a biometric sensor, may be utilized to convey cognitive data pertaining to the entity utilizing the navigation tool. The sensor(s) and associated data are shown herein to be utilized in conjunction with the NL and AI assessment. Referring to FIG. 5, a flow chart (500) is provided demonstrating a dynamic sensor activation of the NL processing system. As shown, one or more sensors, $S_N$, are positioned relative to the navigation tool (502). For example, in an embodiment of the navigation tool operatively coupled to a land vehicle, the sensor(s) may be embedded in one or more locations of the land vehicle, such as the seat, steering wheel, etc. The sensors may come in different forms to acquire different aspects of data as related to the navigation and the operator of the vehicle. In one embodiment, one or more of the sensors may detect perspiration and employed as a factor in assessing stress. Sensor data may be gathered on a periodic basis, or in one embodiment, a sensor or a combination of sensors may dynamically initiate or activate the navigation tool. As shown herein, sensor data is acquired (504), either statically at a set frequency or dynamically. In one embodiment, the sensor data conveys environmental or situational data. The sensor data may fall within an acceptable range, or in one embodiment, an unacceptable range. Following the data acquisition at step (504), it is determined if any of the acquired sensor data is in the unacceptable range, or in a range that may require or suggest modification of associated navigational instructions (506). Accordingly, the sensor data is utilized to identify a situational state either directly or indirectly associated with the navigation tool.

As described, it is understood that the sensor may be triggered by a situational state in place of acquiring sensor data on a schedule or time frequency. In one embodiment, the situational data may correspond to perspiration or stress, and the navigational tool may suggest intervention with the associated situation. It is understood that the sensors detect and gather cognitive data. Similar to cognitive data, a cognitive state is defined as a function of measures of entity behavior over time. The measures include, but are not limited to, musculoskeletal gestures, speech gestures, eye movement, internal physiological changes measured by imaging circuits, microphones, and physiological and kinematic sensors. In one embodiment, certain feature extraction techniques are used for identifying certain cognitive and emotional traits. The cognitive state is dynamic and subject to change. Such changes may be based on circumstances, time of day, level of stress, level of intoxication, etc. One or more of the sensors and associated sensor data yield situational and cognitive data.

A positive response to the determination at step (506) is one form of intervention suggestion, and is followed by consulting the knowledge base for similar sensor data, or sensor data that falls within the range of the acquired sensor data (508). In one embodiment, the knowledge base may be directed to a specific entity and the sensor data comparison and/or evaluation may be similarly directed to the entity. For example, the navigational tool may be embedded in a land vehicle that is periodically utilized by different drivers. The knowledge base may be directed to the vehicle as an entity, or in one embodiment, the knowledge based may be directed to a specific driver of the vehicle. In one embodiment, the driver may be identified by a key or another identifier. Consultation with the knowledge base at step (508) includes identification of the vehicle and/or vehicle driver that is the subject of the sensor and associated sensor data. Accordingly, the integrated sensor data is employed to detect and apply a language pattern commensurate with the physical conditions of the vehicle and/or driver.

Following the consultation at step (508), a template associated with the acquired sensor data is identified (510). The template may be categorized by the vehicle or the driver and contains data directed at NL and associated sensor data. For example, it is understood that different drivers may have different cognitive abilities, and the template may be directed at a style and manner of conveying navigation instructions that is commensurate with the cognitive level of understanding of the vehicle driver, such as, but not limited to, descriptive language utilized with the instructions. It is understood that there may be a plurality of templates present in the knowledge base, with each template providing different NL nuances for conveying instructions. In one embodiment, a vehicle driver may have an assigned template. It is understood that the templates may be based on language, dialect, level of detail, descriptiveness, etc. The acquired sensor data and template identification may warrant a template change or modification, or in one embodiment, may not yield any modification or change.

Following step (510), an assessment is conducted with respect to the template associated with the NL. More specifically, it is determined if the template identified at step (510) matches the currently assigned and utilized template (512). A positive response to the determination at step (512) is followed by continued NL output utilizing the current template (514), and a negative response to the determination at step (512) is followed by changing the template for conveying the instructions and associated NL output (516). It is understood that the sensor data evaluation in view of the available templates in the knowledge base may not yield a match, as evidenced by a negative response to the inquiry at step (506). As demonstrated, a negative response to the determination at step (512) is another indication that there is a mismatch between the sensor data and the utilized template. Absence of a matching template is an indication that the knowledge engine has not previously assigned a specific template to the detected NL data and/or associated sensor setting value(s). Following a negative response to the determination at step (506) or following step (516), the knowledge base is consulting to leverage an existing template, if available, that is closest to matching the requirements of the requirement of the detected NL data and/or sensor setting value(s) (518), followed by a return to step (514) to modify NL and descriptive data conveyance commensurate with the leveraged template. Accordingly, the NL and/or sensor setting values are utilized to identify and select a template to convey NL output data, such as navigation instructions.

Selection and usage of the templates may be commensurate with cognitive aspects of the driver of the land vehicle. For example, in one embodiment, the template change may be replaced by changing the route based on sensor data directed at a driver's level of arousal, fear, engagement, sleepiness, or perception of danger. The machine learning manager (158) may be invoked to create a new template, which in one embodiment may be saved in the knowledge base. In one embodiment, the machine learning manager (158) may be engaged to offer alternate routes when the driver is perceived to be too stressed by the current route. Accordingly, the machine learning manager (158) may be engaged by output from the sensor data in order to invoke route navigation changes in place of template selection.

Figure 6:
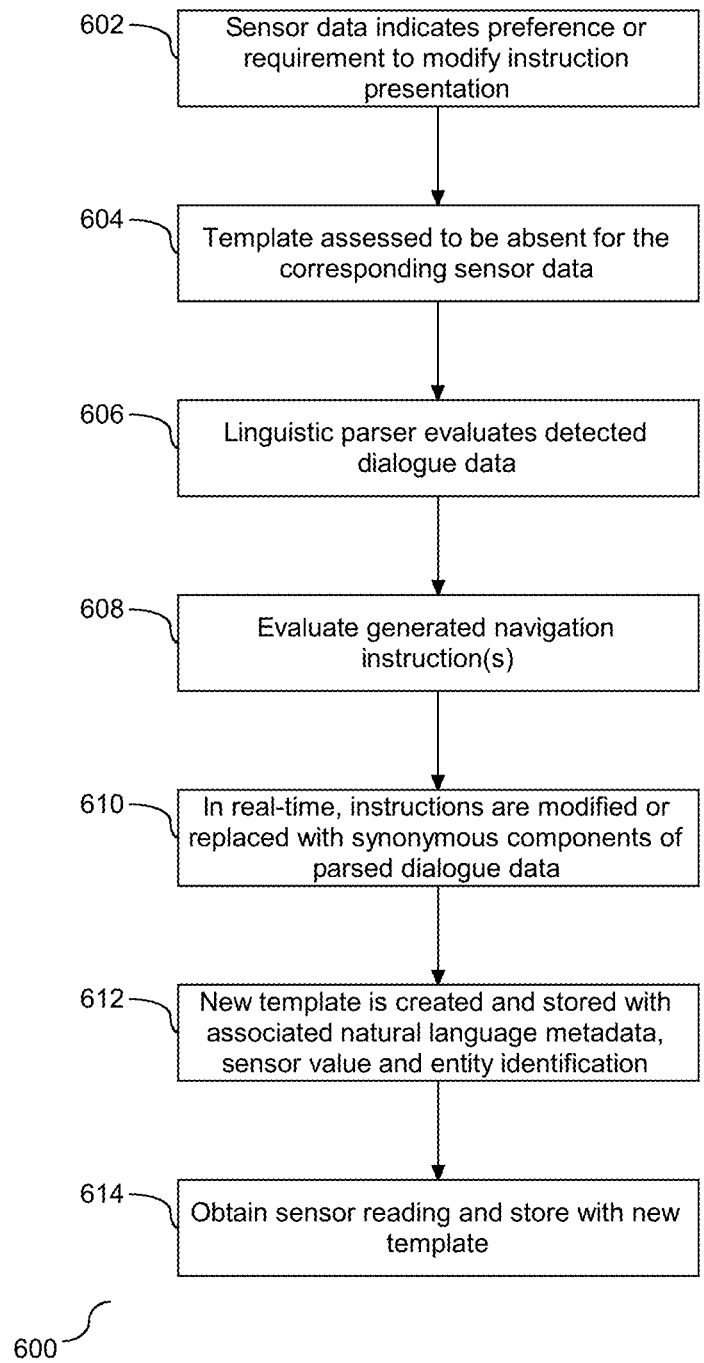
FIG. 6 depicts a flow chart illustrating a process of invoking machine learning in conjunction with the navigation tool and sensor(s).

Referring to FIG. 6, a flow chart (600) is provided illustrating a process of invoking machine learning (ML) in conjunction with the navigation tool and sensor(s). As shown and described in FIG. 5, one or more templates are present in the knowledge base and utilized by the navigation tool to convey instructions commensurate with the entity utilizing the navigation tool and acquired sensor data or sensor setting(s). The machine learning manager (158) may be invoked to create a new template, which in one embodiment may be saved in the knowledge base. As shown and described, sensor data may indicate a preference or requirement to modify the manner in which instructions are conveyed to an entity utilizing the navigation tool (602). Based on the absence of an available template (604), a linguistic parser is leveraged to evaluate detected dialog data directed to the entity (606). Examples of dialogue data include, but are not limited to, language, dialect, descriptiveness. Generated, but not conveyed, navigation instructions are evaluated (608). It is understood that the navigation tool includes settings for conveying route instructions, and the evaluation at step (608) enables the machine learning manager to assess these instructions based on the dialogue data parsed at step (606). In real-time, the machine learning manager (158) modifies or replaces the instructions with grammatical components that are synonymous with the components of the parsed dialogue data (610). A new template is created and stored with associated NL setting metadata, sensor values, and entity and/or vehicle identification (612). Accordingly, navigation instructions are dynamically modified based on the parsed linguistic data.

The machine learning manager (158) supports dynamic generation of navigation instructions. More specifically, the machine learning manager (158) leverages the linguistic parser to learn a level of understanding and to adjust output of the navigation instructions. In addition to the instruction modification, the machine learning manager creates a template for the modified instructions and stores the template in the knowledge base (612). The template creation stores the manner of the instruction modification together with an associated entity identifier. In addition, the sensors that are operatively coupled to the entity are assessed to obtain their settings or sensor output, and to store the associated sensor data with the newly created template (614). Accordingly, customized descriptions are provided and conveyed in realtime to respond to the environmental conditions of the entity and real-time conditions of route traversal.

Figure 7:
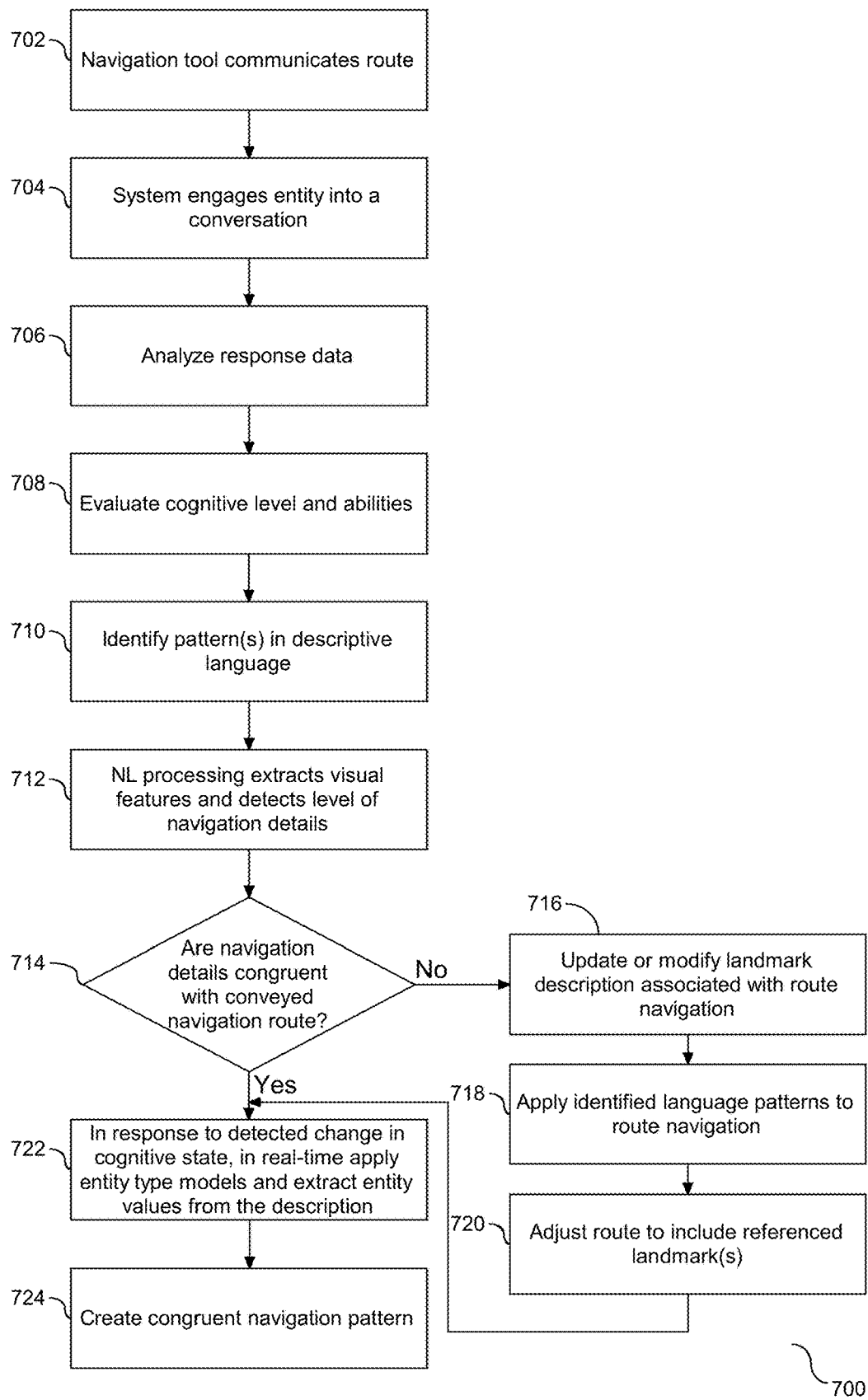
FIG. 7 depicts a flow chart illustrating a method of route navigation with associated driver engagement.

Referring to FIG. 7, a flow chart (700) is provided illustrating a method of route navigation with associated driver engagement. The navigation tool or application utilizes AI to solicit and process conversational data. As shown and described in FIG. 1, the knowledge engine (150) is configured with tools to parse and process the data. At such time as a route is communicated (702), the navigation tool, hereinafter referred to as the system, engages the entity utilizing the tool in a conversation (704). This engagement is directed at facilitating effective and safe navigation. Responses received by the system are analyzed (706). In one embodiment, responses from previous conversations may be used as a comparison basis for the analysis conducted at step (706). The cognitive level and abilities of the driver to understand the navigation route are evaluated (708). In one embodiment, at step (708), the system analyzes the level of details that are important to the driver while identifying surrounding objects and landmarks. Additionally, the system identifies patterns in descriptive language (710) and utilizes NL processing to extract important visual features and detect levels of the navigation details that are distinguishable and important for the driver traversing the route (712).

It is then determined if the evaluated navigation details are congruent with the navigation route being conveyed (714). A negative response to the determination at step (714) is followed by the machine learning manager (148) updating or modifying the landmark description associated with the route navigation (716) and application of the identified language patterns to the route navigation (718), thereby effectively modifying the navigation instructions. The machine learning manager (158) adjusts the route to include the referenced landmarks that have been determined distinguishable by the driver (720). Following a positive response to the determination at step (714) or following step (720), a change in the cognitive state is demonstrated. It is understood that the change may be detected at any time during route traversal and is not limited to the order and position shown herein. In one embodiment, the cognitive state change may be ascertained by a change in level of details in directions provided by the vehicle driver, repeated deviation from the route, indication that the driver is lost or cannot follow directions, etc. Responsive to the cognitive state change, the machine learning manager applies entity type models in real-time to extract entity values from the description present in the dialog (722), and creates a congruent navigation pattern (724). Accordingly, natural language understanding is utilized to selectively modify the route and associated navigation responsive to a detected cognitive state change.

Figure 8:
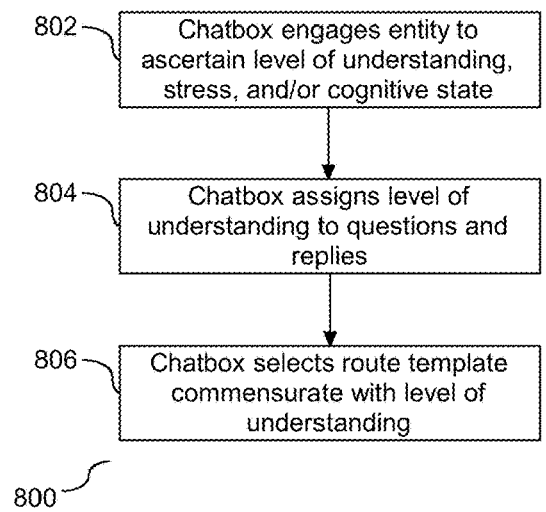
FIG. 8 depicts a flow chart illustrating use of a chatbox with the navigation tool.

It is understood that the cognitive state may be identified with a congruent level of understanding for route navigation and associated instructions. In one embodiment, the machine learning manager (158) may create a new template commensurate with the cognitive state that may be shared with other drivers with the same or similar cognitive state determination(s). A different or new driver or user of the navigation tool may have the same or similar cognitive state values, and can have a pre-configured level of understanding for route navigation directed to the cognitive state values. Referring to FIG. 8, a flow chart (800) is provided illustrating use of chatbox with the navigation tool. In one embodiment, the chatbox replaces or augments the functionality of the machine learning manager (158). The chatbox, also known as a talkbot, chatterbot, bot, IM box, interactive agent, or artificial conversational entity, is a computer program or application which conducts a conversation via auditory or textual methods. In one embodiment, the chatbox uses NL processing. As shown herein, the chatbox engages the vehicle driver to ascertain their level of understanding, stress, and/or cognitive state (802). For example, the chatbox may solicit geographical descriptions from the driver, such as building position, shape, color, distance to the road, building material, etc. If the driver does not provide a color in response to the solicited request, this may be an indication that the driver is color blind or that color is not an important characteristic to the driver. The chatbox assigns a level of understanding to each question and each reply (804). For example, in one embodiment, the chatbox may have a list of questions, with each answer being assigned one or two values based on the response, with the values being an indicator of detailed response or not detailed response. Based on a compilation of the answers provides, the chatbox detects or ascertains a level of understanding and selects a route template commensurate with the level (806). The route template provides navigation instructions for the determined route at a level of understanding that is comprehensible to the driver. Accordingly, the machine learning manager functions to ascertain a level of understanding and to translate the ascertained level to associated navigation instructions.

As shown and described in FIGS. 1-8, the identification and application of natural language processing to a physical activity may cause an associated machine, e.g. hardware device, to perform an action. With respect to a navigational tool, the physical activity may be in the form of a route or instruction modification. In one embodiment, the navigational tool may operate in different states, including but not limited to, sleep hibernate, on, off, etc. Similarly, in one embodiment, the natural language processing tools may be operatively coupled to a second physical hardware device that may be subject to actuation response to the NL processing and/or cognitive assessment gathered from associated sensors.

Figure 9:
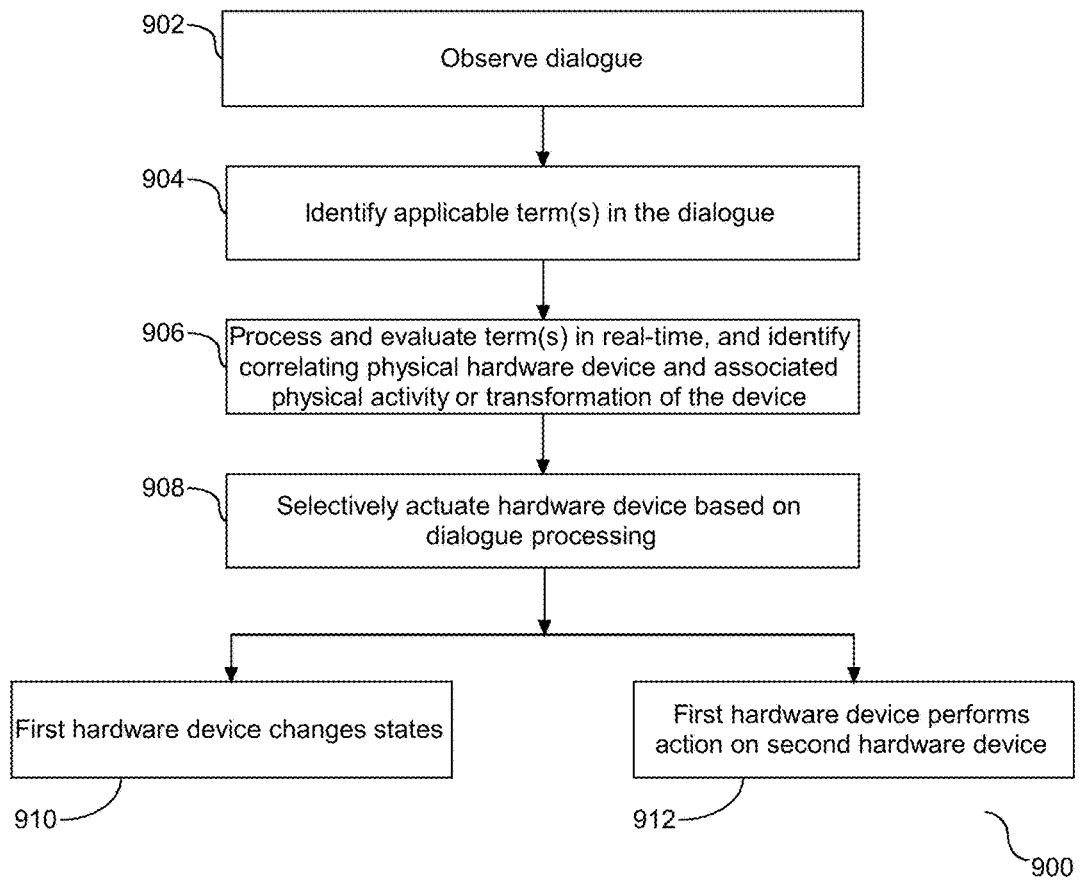
FIG. 9 depicts a flow chart illustrating a process for processing a dialogue in relation to a physical hardware device.

Referring to FIG. 9, a flow chart (900) is provided illustrating a processing a dialogues in relation to a physical hardware device. As shown, a dialogue is observed (902) and one or more applicable terms in the dialogue are identified (904). The terms are processed and evaluated in real-time to identify a correlating physical hardware device and an associated physical activity or transformation of the device (906). The correlating physical hardware device is selectively actuated based on the dialogue processing (908). This actuation at step (908) may cause the first hardware device to change states (910), e.g. from a first state to a second state. Similarly, this actuation may result in the first hardware device to perform an action on a second hardware device (912). In this example, the first and second hardware devices are different and the corresponding actions are different. In one embodiment, the corresponding dialogue data may be addressed to a physical device and identify a state of the device corresponding to the identified term(s) in the dialogue. Accordingly, as shown a physical intent from the dialogue data is converted into a physical manifestation that produces one or more physical transformations.

The linguistic analysis processing shown and described in FIGS. 3-9 may be performed by a natural language processing system, such as the information handling system shown in FIG. 1, or any suitable information handling system. In one embodiment, a sentence parsing tool is applied to break the text representation into constituent parts to find the sentence parts and location sequence, and to identify a segment or keyword within the representation.

The system and flow charts shown herein may also be in the form of a computer program device for use with an intelligent computer platform in order to facilitate NL processing. The device has program code embodied therewith. The program code is executable by a processing unit to support the described functionality.

Embodiments may also be in the form of a computer program device for use with an intelligent computer platform in order to assist the intelligent computer platform to evaluate text input of audio data. The device has program code embodied therewith. The program code is executable by a processing unit to parse and/or evaluate text representation with respect to a taxonomy or a taxonomy service.

Figure 10:
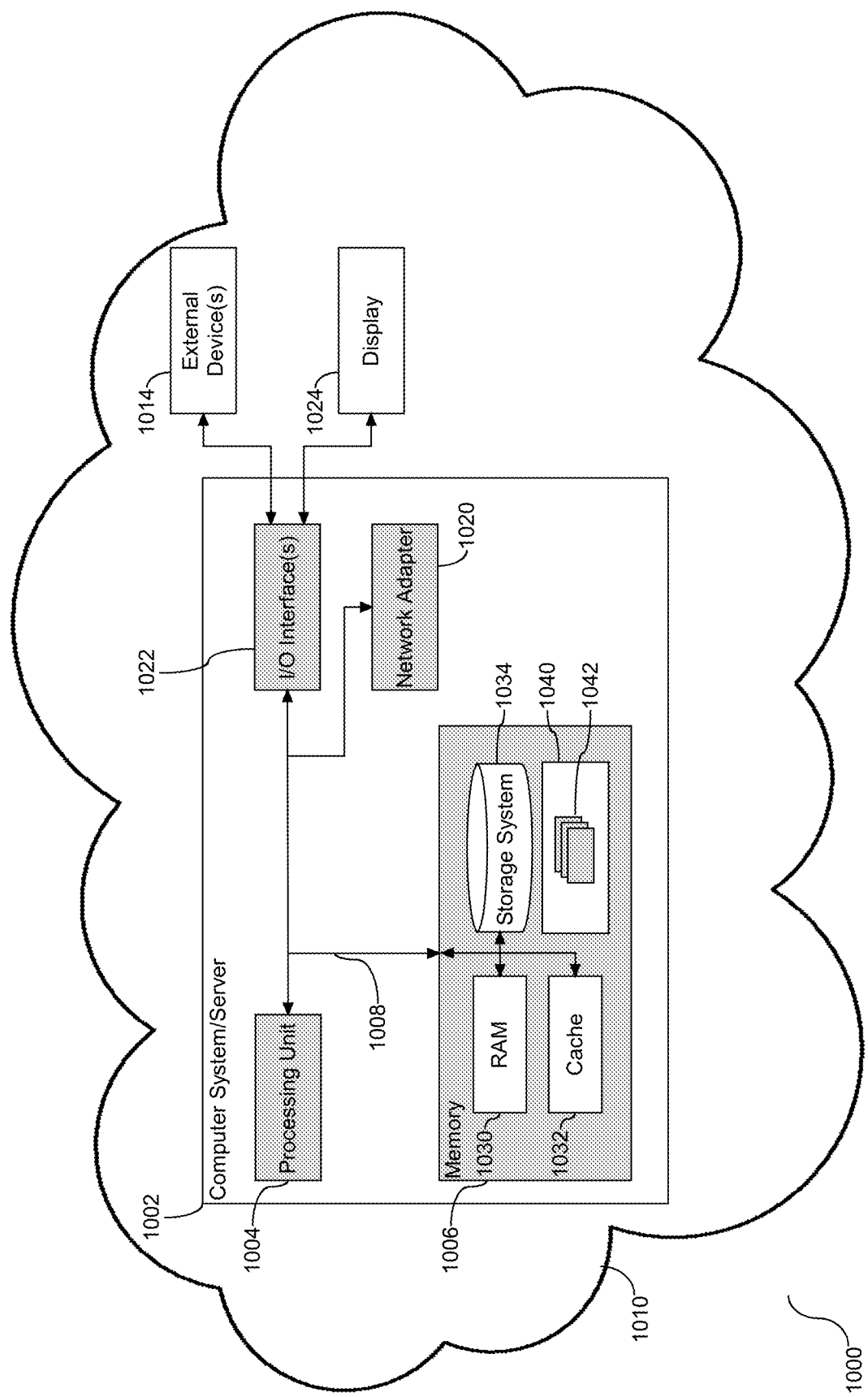
FIG. 10 is a block diagram illustrating an example of a computer system/server of a cloud based support system, to implement the process described above with respect to FIGS. 3-9.

FIG. 10, a block diagram (1000) is provided illustrating an example of a computer system/server (1002), hereinafter referred to as a host (1002) in communication with a cloud based support system, to implement the processes described above with respect to FIGS. 1-9. Host (1002) is operational with numerous other general purpose or special purpose computing system environments or configurations. Examples of well-known computing systems, environments, and/or configurations that may be suitable for use with host (1002) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (1002) may be described in the general context of computer system-executable instructions, such as program modules, being executed by a computer system. Generally, program modules may include routines, programs, objects, components, logic, data structures, and so on that perform particular tasks or implement particular abstract data types. Host (1002) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, host (1002) is shown in the form of a general-purpose computing device. The components of host (1002) may include, but are not limited to, one or more processors or processing units (1004), a system memory (1006), and a bus (1008) that couples various system components including system memory (1006) to processor (1004). Bus (1008) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1002) typically includes a variety of computer system readable media. Such media may be any available media that is accessible by host (1002) and it includes both volatile and non-volatile media, removable and non-removable media.

Memory (1006) can include computer system readable media in the form of volatile memory, such as random access memory (RAM) (1030) and/or cache memory (1032). By way of example only, storage system (1034) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (808) by one or more data media interfaces.

Program/utility (1040), having a set (at least one) of program modules (1042), may be stored in memory (1006) by way of example, and not limitation, as well as an operating system, one or more application programs, other program modules, and program data. Each of the operating systems, one or more application programs, other program modules, and program data or some combination thereof, may include an implementation of a networking environment. Program modules (1042) generally carry out the functions and/or methodologies of embodiments to data modeling directed at object representation, similarity computation, adaptive attention, and natural language processing associated with cognitive assessment and navigation instructions. For example, the set of program modules (1042) may include the modules configured as the knowledge engine and associated tools and API as described in FIGS. 1 and 2, respectively.

Host (1002) may also communicate with one or more external devices (1014), such as a keyboard, a pointing device, a sensory input device, a sensory output device, etc.; a display (1024); one or more devices that enable a user to interact with host (1002); and/or any devices (e.g., network card, modem, etc.) that enable host (1002) to communicate with one or more other computing devices. Such communication can occur via Input/Output (I/O) interface(s) (1022). Still yet, host (1002) can communicate with one or more networks such as a local area network (LAN), a general wide area network (WAN), and/or a public network (e.g., the Internet) via network adapter (1020). As depicted, network adapter (1020) communicates with the other components of host (1002) via bus (1008). In one embodiment, a plurality of nodes of a distributed file system (not shown) is in communication with the host (1002) via the I/O interface (1022) or via the network adapter (1020). It should be understood that although not shown, other hardware and/or software components could be used in conjunction with host (1002). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1006), including RAM (1030), cache (1032), and storage system (1034), such as a removable storage drive and a hard disk installed in a hard disk drive.

Computer programs (also called computer control logic) are stored in memory (1006). Computer programs may also be received via a communication interface, such as network adapter (1020). Such computer programs, when run, enable the computer system to perform the features of the present embodiments as discussed herein. In particular, the computer programs, when run, enable the processing unit (1004) to perform the features of the computer system. Accordingly, such computer programs represent controllers of the computer system.

In one embodiment, host (1002) is a node (1010) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
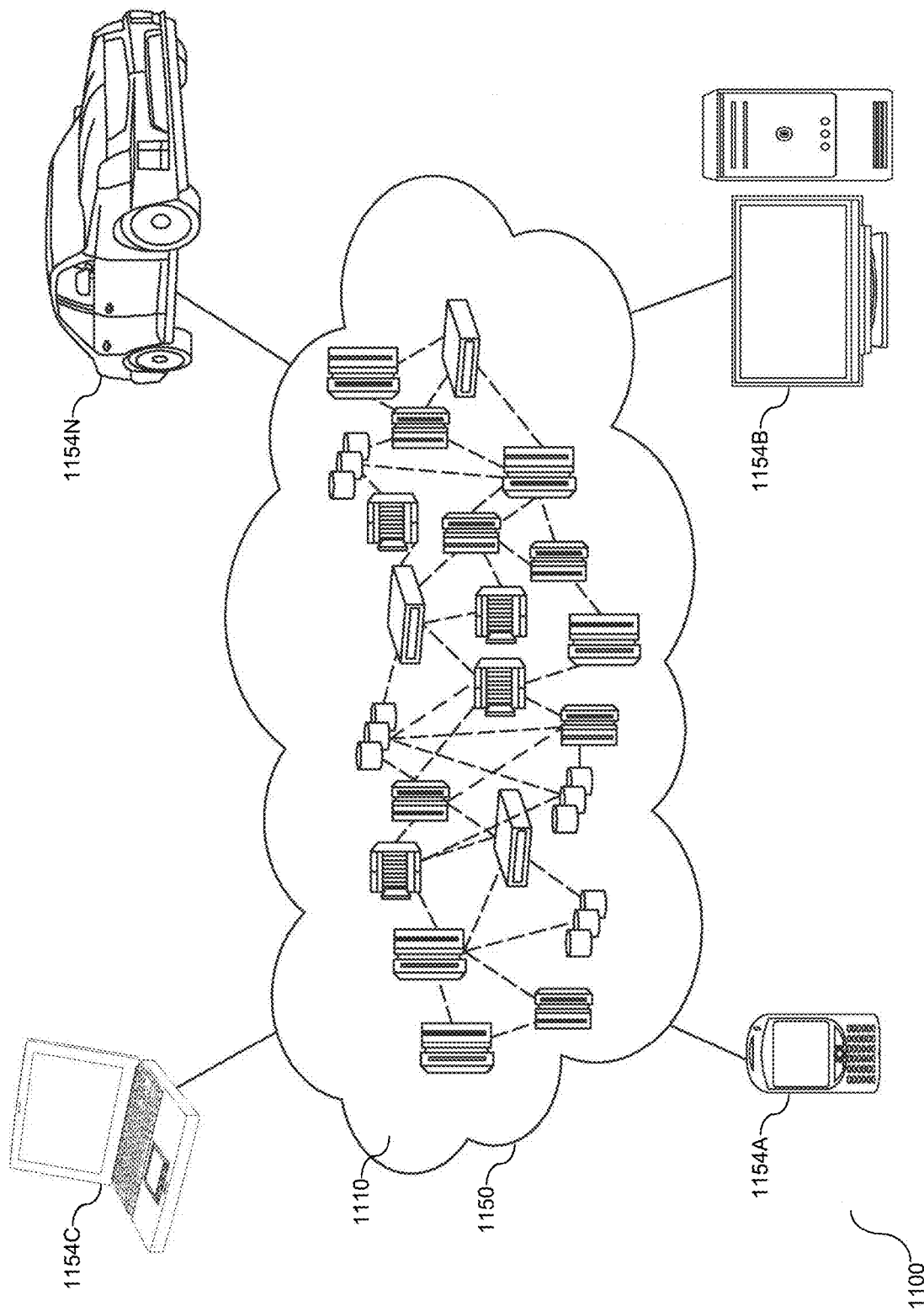
FIG. 11 depicts a block diagram illustrating a cloud computer environment.

Referring now to FIG. 11, an illustrative cloud computing network (1100). As shown, cloud computing network (1100) includes a cloud computing environment (1150) having one or more cloud computing nodes (1110) with which local computing devices used by cloud consumers may communicate. Examples of these local computing devices include, but are not limited to, personal digital assistant (PDA) or cellular telephone (1154A), desktop computer (1154B), laptop computer (1154C), and/or automobile computer system (1154N). Individual nodes within nodes (1110) may further communicate with one another. They may be grouped (not shown) physically or virtually, in one or more networks, such as Private, Community, Public, or Hybrid clouds as described hereinabove, or a combination thereof. This allows cloud computing environment (1100) to offer infrastructure, platforms and/or software as services for which a cloud consumer does not need to maintain resources on a local computing device. It is understood that the types of computing devices (1154A-N) shown in FIG. 11 are intended to be illustrative only and that the cloud computing environment (1150) can communicate with any type of computerized device over any type of network and/or network addressable connection (e.g., using a web browser).

Figure 12:
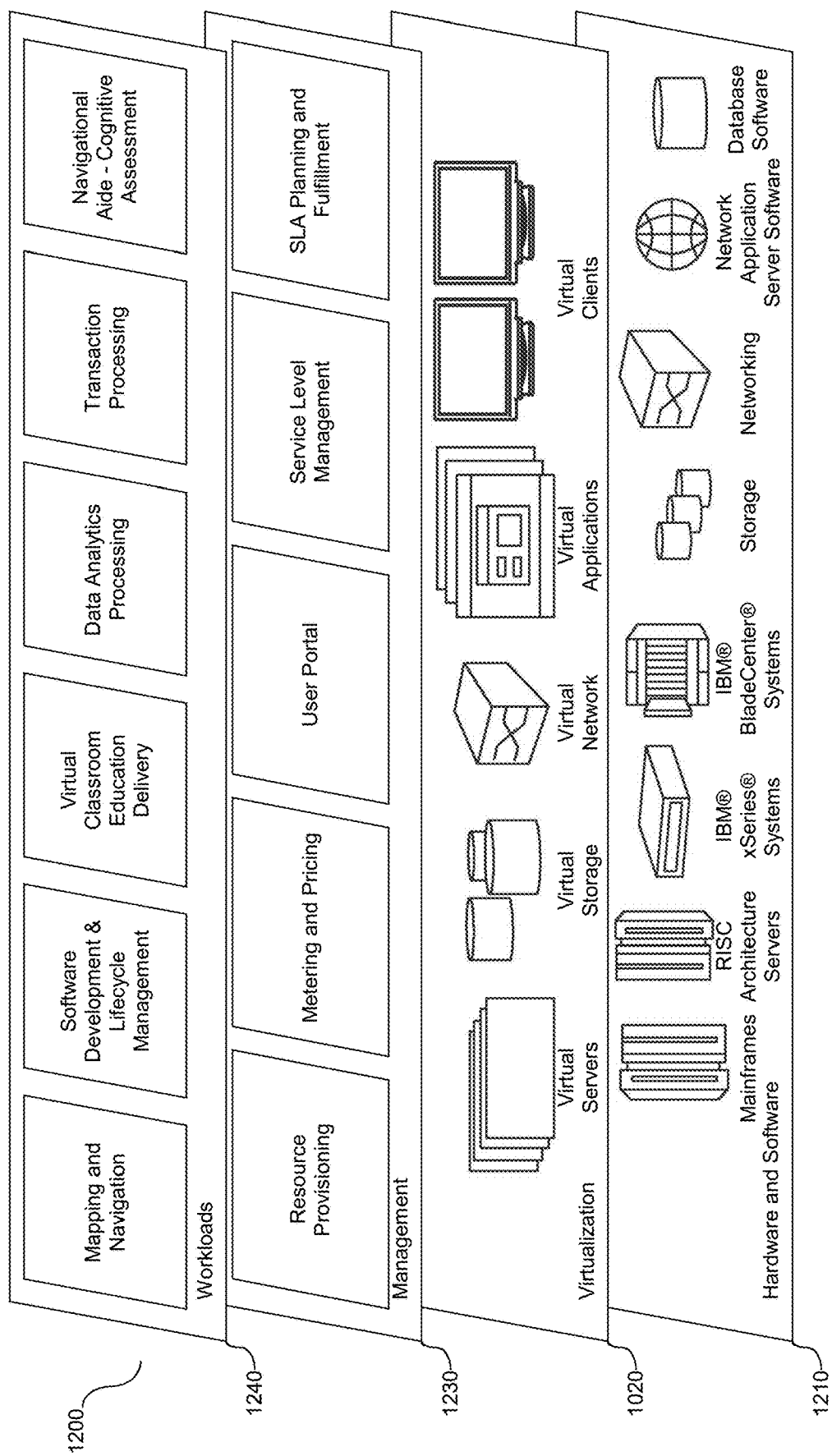
FIG. 12 depicts a block diagram illustrating a set of functional abstraction model layers provided by the cloud computing environment.

Referring now to FIG. 12, a set of functional abstraction layers (1200) provided by the cloud computing network of FIG. 10 is shown. It should be understood in advance that the components, layers, and functions shown in FIG. 12 are intended to be illustrative only, and the embodiments are not limited thereto. As depicted, the following layers and corresponding functions are provided: hardware and software layer (1210), virtualization layer (1220), management layer (1230), and workload layer (1240). The hardware and software layer (1210) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1220) provides an abstraction layer from which the following examples of virtual entities may be provided: virtual servers; virtual storage; virtual networks, including virtual private networks; virtual applications and operating systems; and virtual clients.

In one example, management layer (1230) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1240) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and cognitive assessment directed at a navigational aide.

It will be appreciated that there is disclosed herein a system, method, apparatus, and computer program product for evaluating natural language input, detecting one or more tags, and prepending one or more selected tags to the natural language input. As disclosed, the system, method, apparatus, and computer program product apply natural language processing to an information source, which in one embodiment, is operatively coupled to and actuates a physical hardware device.

While particular embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of a one or more physical hardware devices or operating states thereof.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products according to the embodiment(s). It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the natural language processing may be carried out by different computing platforms or across multiple devices. Furthermore, the data storage and/or corpus may be localized, remote, or spread across multiple systems. Accordingly, the scope of protection of the embodiment(s) is limited only by the following claims and their equivalents.

What is claimed is:

1. A computer system comprising:
   a processing unit operatively coupled to memory;
   a knowledge engine, in communication with the processing unit, configured to transform a navigational tool in real-time, the knowledge engine including:
      an information handling manager configured to receive and process natural language (NL) input data, the NL input data including information characterizing one or more objects or landmarks;
      a parser, operatively coupled to the information handling system, configured to parse the NL input data into two or more grammatical sub-components;
      an analyzer, operatively coupled to the parser, configured to analyze the parsed input data and identify a category for a parsed grammatical sub-component;
      the information handling manager configured to:
         apply the parsed input data and the identified category to an operating state detected by a sensor;
         dynamically translate the identified category to a NL navigation instruction congruent with the parsed sub-component; and
         monitor the operating state detected by the sensor, and responsive to a change in the detected operating state identify an existing category proximal to the changed operating state; and
      dynamically translate the identified existing category to an updated NL navigation instruction congruent with the changed detected operating state, wherein the information identifying the one or more objects or landmarks is incorporated into the updated NL navigation instruction.

2. The system of claim 1, further comprising the information handling manager, configured to capture the detected operating state and align the received NL input and the captured operating state.

3. The system of claim 2, further comprising the analyzer, configured to dynamically detect a NL pattern from the received input data and map the changed operating state with the detected NL pattern.

4. The system of claim 2, further comprising a machine learning (ML) manager, configured to dynamically modify the profile data in response to receipt of additional NL input data.

5. The system of claim 1, further comprising a machine learning manager, operatively coupled to the information handling manager, configured to detect a cognitive state responsive to the dynamic translation of the identified category to the NL navigation instruction, wherein the cognitive state detection includes the detected operating state change.

6. The system of claim 1, further comprising a first hardware device operatively coupled to the knowledge engine, the first hardware device configured to receive the congruent navigation instruction, wherein receipt of the congruent navigation instruction causes a physical action comprising the first hardware device to change states, actuation of a second hardware device, or a combination thereof.

7. The system of claim 1, wherein the two or more grammatical sub-components comprise a language pattern, a linguistic term, or a visual characteristic.

8. A computer program product to process natural language (NL), the computer program product comprising a computer readable storage device having program code embodied therewith, the program code executable by a processing unit to:

receive and process natural language (NL) input data, the NL input data including information characterizing one or more objects or landmarks;

parse the NL input data into two or more grammatical sub-components;

analyze the parsed input data and identify a category for a parsed grammatical sub-component;

apply the parsed input data and the identified category to an operating state detected by a sensor;

dynamically translate the identified category to a NL navigation instruction congruent with the parsed sub-component;

monitor the operating state detected by the sensor, and responsive to a change in the detected operating state, identify an existing category proximal to the detected change in the operating state; and dynamically translate the identified existing category to an updated NL navigation instruction congruent with the changed detected operating state, wherein the information identifying the one or more objects or landmarks is incorporated into the updated NL navigation instruction.

9. The computer program product of claim 8, further comprising program code to capture the detected operating state and align the received NL input and the captured operating state.

10. The computer program product of claim 9, further comprising the program code to dynamically detect a NL pattern from the received input data and map the changed operating state with the detected NL pattern.

11. The computer program product of claim 9, further comprising program code to dynamically modify the profile data in response to receipt of additional NL input data.

12. The computer program product of claim 8, further comprising program code to detect a cognitive state responsive to the dynamic translation of the identified category to the NL navigation instruction, wherein the cognitive state detection includes the detected operating state change.

13. The computer program product of claim 8, further comprising a first hardware device operatively coupled to the computer program product, the first hardware device configured to receive the congruent navigation instruction, wherein receipt of the congruent navigation instruction causes a physical action comprising the first hardware device to change states, actuation of a second hardware device, or a combination thereof.

14. The computer program product of claim 8, wherein the two or more grammatical sub-components comprise a language pattern, a linguistic term, or a visual characteristic.

15. A method comprising:

detecting natural language (NL) input data and analyzing the NL input data response to the detection, the NL input data including information characterizing one or more objects or landmarks;

parsing the NL input data into two or more grammatical sub-components;

analyzing the parsed input data and identifying a category for a parsed grammatical sub-component;

applying the parsed input data and the identified category to an operating state detected by a sensor;

dynamically translating the identified category to a NL navigation instruction congruent with the parsed sub-component;

monitoring the operating state detected by the sensor, and responsive to a change in the detected operating state, identifying an existing category proximal to the changed operating state; and dynamically translating the identified existing category to an updated NL navigation instruction congruent with the changed detected operating state, wherein the information identifying the one or more objects or landmarks is incorporated into the updated NL navigation instruction.

16. The method of claim 15, further comprising capturing the detected operating state and aligning the received NL input and the captured operating state.

17. The method of claim 15, further comprising detecting a cognitive state responsive to the dynamic translation of the identified category to the NL navigation instruction, wherein the cognitive state detection includes the detected operating state change.

18. The method of claim 15, further comprising a first hardware device operatively coupled to the knowledge engine, the first hardware device receiving the congruent navigation instruction, wherein receipt of the congruent navigation instruction causes a physical action comprising the first hardware device to change states, actuation of a second hardware device, or a combination thereof.

19. The method of claim 15, wherein the two or more grammatical sub-components comprise a language pattern, a linguistic term, or a visual characteristic.

* * * * *